United States Patent
Luke

(10) Patent No.: US 6,813,712 B1
(45) Date of Patent: Nov. 2, 2004

(54) VIRAL REPLICATION DETECTION USING A COUNTER VIRUS

(75) Inventor: James Steven Luke, Fareham (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/376,141

(22) Filed: Aug. 17, 1999

(30) Foreign Application Priority Data

May 27, 1999 (GB) .............................................. 9912254

(51) Int. Cl.$^7$ .......................... G06F 11/30; G06F 11/00; H04L 9/00; H04L 9/32
(52) U.S. Cl. ...................... 713/200; 713/200; 713/201; 714/28; 714/38
(58) Field of Search ............................... 713/200, 201; 703/21; 714/38, 28

(56) References Cited

U.S. PATENT DOCUMENTS

| | | | | |
|---|---|---|---|---|
| 5,278,901 A | * | 1/1994 | Shieh et al. ................. | 713/200 |
| 5,452,442 A | * | 9/1995 | Kephart ........................ | 714/38 |
| 5,675,711 A | * | 10/1997 | Kephart et al. ................ | 706/12 |
| 5,978,917 A | * | 11/1999 | Chi .............................. | 713/211 |
| 6,108,799 A | * | 8/2000 | Boulay et al. ................. | 714/38 |

FOREIGN PATENT DOCUMENTS

JP 11282673 10/1999

OTHER PUBLICATIONS

"Welcome to Symantec.com" homepage, wysiwyg://46http://symantec.com/index.html, Jan. 17, 2000.

AntiVirus Research Center, SARC—"Computer Viruses: An Executive Brief", http://www.symantec.com/avcenter/reference/corpst.html, pp. 1–14.

AntiVirus Research Center, SARC—"Macro Viruses", http://www.symantec.com/avcenter/venc/data/wm.acro.html, pp. 1–9.

Supplier No. 20877795, "Antivirus Software", Philip Albinus, Home Office Computing, vol. 16, No. 7, p. 105(6), Jul. 1998, ISSN: 0899–7373.

* cited by examiner

*Primary Examiner*—Gilberto Barrón
*Assistant Examiner*—A. Nobahar
(74) *Attorney, Agent, or Firm*—Gail H. Zarick; Rafael Perez-Pineiro; Harrington & Smith, LLP

(57) ABSTRACT

The invention comprises a counter virus agent for detecting viral infection of a computer system. The agent identifies potential host files for the agent within the computer system; and controls replication of the agent within the host files to maintain the agent at a pre-determined population level. When instantiated within one of the host files, the agent determines the population level of the agent within the computer system; and, responsive to the population level exceeding the pre-determined population level, indicates possible viral infection of the computer system.

10 Claims, 1 Drawing Sheet

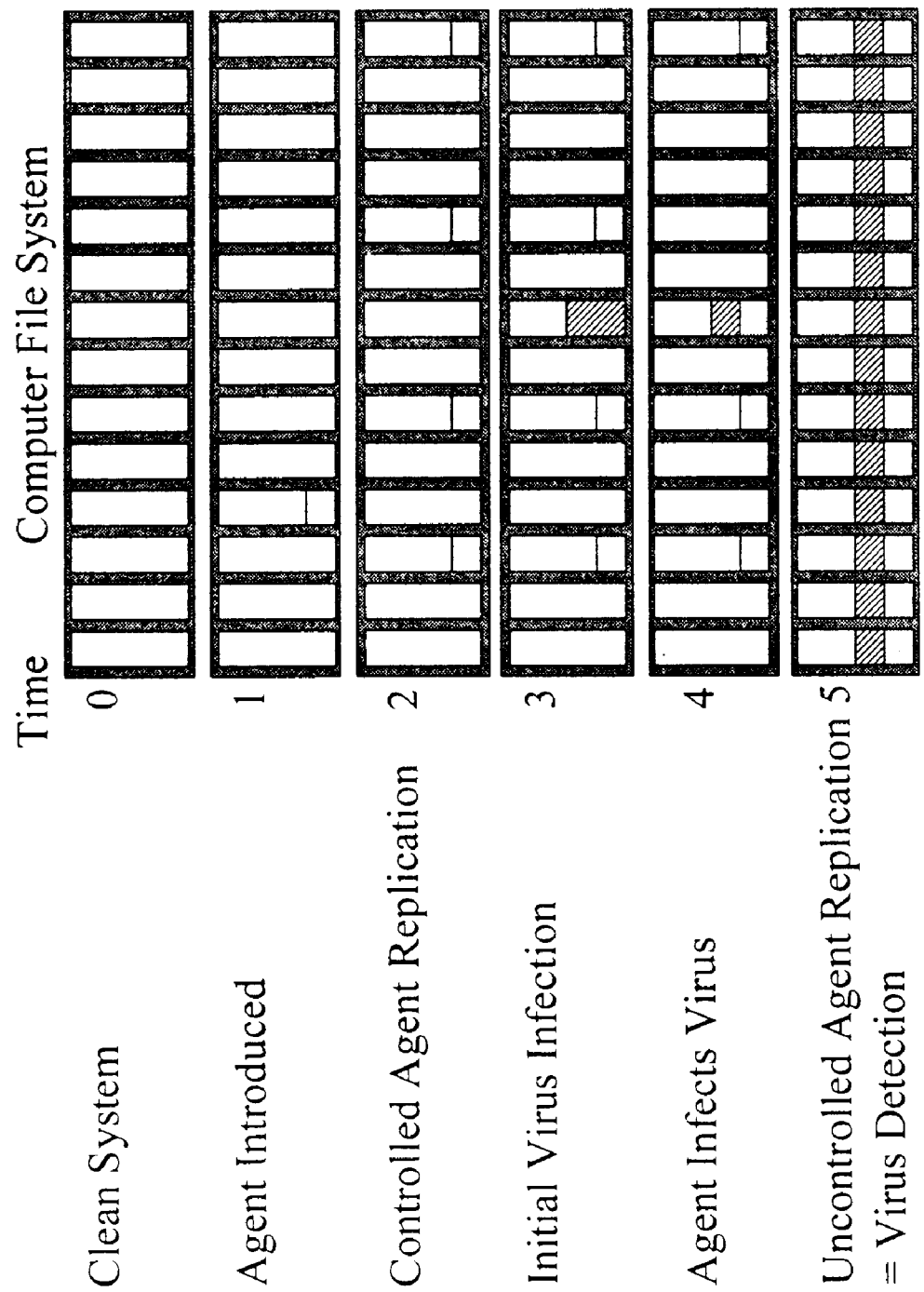

VIRAL REPLICATION DETECTION USING A COUNTER VIRUS

FIELD OF THE INVENTION

The present invention relates to a parasitic counter virus for detection of previously unseen malicious computer viruses through the infection of such computer viruses.

BACKGROUND OF THE INVENTION

Computer viruses generally have three components: a search mechanism to determine which files the virus can infect; an infection mechanism which causes the virus to replicate; and a payload, which can vary between simply displaying a message on a computer screen to completely destroying the contents of a hard disk.

Traditionally, viruses have tended to be passed from computer to computer within executable code, and anti-virus technology has largely concentrated on detecting such viruses. As such, existing virus detectors rely on the detection of one or a combination of the following:

- a known virus signature;
- a typical virus behaviour; or
- a change in a system metric such as an integrity checksum.

Previously, computer users have assumed that only executable files could host and transmit viruses and so receiving non-executable documents from third parties, which is increasingly common with rapidly expanding Internet e-mail use, was considered to be safe. However, a new type of virus has recently emerged—the macro virus. Such viruses are passed between computers within general purpose application files, for example, a word processor document, a spreadsheet or database file.

These viruses take advantage of scripting facilities now commonly available within general purpose applications enabling development of user defined applications. Examples are Microsoft applications which include a Visual Basic interpreter within MS Office applications such as Word, Excel and Access, and Lotus applications which use Lotus script with Smartsuite applications such as Wordpro, Lotus 1-2-3, Approach and Freelance.

In general these scripting languages comprise an application-specific object oriented class structure, with each class having a pre-defined set of properties, methods and events, which can be used in conjunction with the processing facilities provided by the scripting language. Users are free to write macros which are responsive to events on instantiated objects and which carry out a specific task. For example, a user who is worried about losing changes to a spreadsheet, may write a macro which responds to the cellvaluechanged event triggering on the range of values being edited to cause the spreadsheet to be saved every time a change to the range is made.

Macros are usually stored within a host document, but in the case of Microsoft Word, in particular, it is possible to store a macro within a global template, Normal.dot, with that macro activating whenever the same event triggers in every document subsequently being opened in MS Word. So, for example, a macro placed in the global template could respond to every document being saved or opened to cause a backup copy of the document to be made.

Macro viruses are generally triggered when their host document is loaded into an application. Their search mechanism usually finds one or more documents on the hard disk generated from the same application. It is usually possible to open these documents without them being viewed by the user and then to copy the macro virus into the other document. Visual Basic provides a specific command "MacroCopy" to allow this infection mechanism to operate. The payload is usually triggered at some point in the future to give the virus time to infect documents without being detected. For example, the virus can include a macro which responds to a file save event to check the date or time and if this is say April, 13 or the 55th second of the hour, the payload macro can in many cases do literally anything, such as deleting system files as in the case of the Nuclear.B virus.

DISCLOSURE OF THE INVENTION

Accordingly, the present invention provides a counter virus agent for detecting viral infection of a computer system comprising: a means for identifying potential host files for said agent within said computer system; a means for controlling replication of said agent within said host files to maintain said agent at a pre-determined population level; a means, instantiable within one of said host files, for determining the population level of said agent within said computer system; and means, responsive to said population level exceeding said pre-determined population level, for indicating possible viral infection of said computer system.

Preferably the counter virus, not only detects macro viruses, but any viruses which can be parasitically infected and which allow the counter virus to be replicated with said viruses.

The invention involves the deliberate release of a beneficial counter virus with a pre-determined population level. On execution, the counter virus scans the visible file system for other instances of the counter virus, determines the counter virus population level and either self-destructs or infects other files depending on the population level. These actions are taken with the sole objective of maintaining the counter virus population at a level which represents a fraction of the overall files in the system. In this way the population is maintained unless the counter virus infects another (unauthorised) virus, in which case the replication mechanism of the unauthorised virus overcomes the population control mechanism of the counter virus. The resulting increment in population of the counter virus reveals the existence of an unauthorised replication mechanism and therefore the existence of an unknown virus.

The population increment is detected at the next execution of an instance of the counter virus when the counter virus can advise the computer user of the infection of the file system and possibly enable the system to be cleaned-up before the virus payload operates.

Preferably, the counter virus infects an unauthorised virus in such a way that it does not interfere with the operation of the unauthorised virus and is replicated along with the unauthorised virus. For example, a macro virus which replicates using a macro copy command will be vulnerable to detection by the counter virus of the invention, whilst a low level virus which replicates by copying a specified number of bytes will be less vulnerable.

Also, the counter virus should ensure that the replication of a host software component, which may only be a sub section of a file, also includes the replication of the agent.

Nonetheless, an important benefit of this invention is that there is no need for prior knowledge of either the attacking virus or the file system.

BRIEF DESCRIPTION OF THE DRAWING

Embodiments of the invention will now be described with reference to the accompanying drawing which shows the installation and operation of a counter virus agent according to the invention.

Referring now to the drawing, which illustrates first a clean computer system where files are represented as a row of bars at time 0. The invention comprises an agent including a population control mechanism acting as a beneficial virus. The agent is introduced at time 1, by either introducing a file including the counter virus into the system or manually "infecting" a file with the counter virus. At a time 2 afterwards, the counter virus executes and replicates itself around the computer file system until its population reaches a pre-determined level. At time 3 a virus is introduced into the file system and at some time afterwards, time 4, the counter virus executes to copy itself into the virus. When the virus begins to replicate, at time 5, it copies with it the counter virus, so that the next time the counter virus executes, it can detect the growth in its population and so warn the user that the file system has been infected.

In this way the sudden overpopulation of the agent, caused by the uncontrolled replication of the virus, enables detection.

Significantly the architectures which provide the optimum environment for the invention are those which are currently the source of the greatest viral threat:

- application languages such as MS Visual Basic for applications where an attacking virus is implemented as a Macro and replicated using the MacroCopy command. This enables the counter virus to simply insert itself in the virus macro for replication at the same time as a virus; and
- object based languages where entire objects, or files, are replicated around a system. The fact that the entire object/file is copied means that the counter virus can simply attach itself to the object/file for replication at the same time as a virus.

DESCRIPTION OF THE PREFERRED EMBODIMENTS

A first embodiment of the invention is based around the MacroCopy function which enables an entire block of counter virus code, including the macro start and end statements, to be copied into a target file. The counter virus also uses text insertion functionality which enables a number of lines to be copied into a target macro which may, or may not, be a virus in contrast with a conventional virus which copies entire macros into documents.

Both of these methods of replication are supported by existing macro languages and the embodiment can be easily performed in such an environment whenever these two methods of replication are achievable.

Referring now to table #1, which shows a typical macro virus in pseudo-code form. This macro can stand alone and be called by inserting a call to the virus macro within another macro for any one of a number of events within an application, for example, AutoExec, AutoOpen or FilePrint in Microsoft Word. Alternatively, the text of the macro could be included directly as the macro which responds to such events. In any case, once such an event triggers, the virus searches for files to infect. In the case of an MS Word virus, filelist would typically comprise all MS Word files stored on the hard disk. Typically macro languages allow a file to be open without being viewed and so the virus then loops through any number of the files in filelist and copies the virus macros to those files not already infected.

It will be seen, however, that opening a number of files to infect them may cause excessive hard drive activity and so draw the attention of the user to the infection. Thus, viruses either infect only a small number of files at a time or operate only when there is significant hard disk activity such as when an infected file is opened or closed.

An alternative and stealthier method of incrementally infecting other files is particular to MS Word and other applications which include a global template into which macros can be copied. Some MS Word viruses copy their macros into the Word global template Normal.dot. At least one of these macros is then programmed to copy the complete set of virus macros from the global template into the active document. This means that as documents are loaded into Word they become infected, and should they in turn be loaded into other copies of Word, those copies become infected in the same way.

Referring now to table #2, the counter virus includes a signature, in this case "ZXYZ" enabling whichever copy of the counter virus which is currently being executed to identify other copies of the counter virus.

The signature could of course be much more complex or, in some cases, the infection of a document with the counter virus could be indicated simply by the presence of a macro with a pre-determined name, in this case "Parasitic".

The counter virus again operates by looking for all potential host files into which it may replicate Filelist. In this case, the files will need to support the counter virus macro language. So a counter virus operating within MS Word gets a list of all Word documents on a hard disk. It will therefore be seen that several different strains of counter virus may be operating independently on a computer system at the same time: one detecting infection in Word processor documents, one for spreadsheets and one for executable files as will be explained later.

The counter virus then iterates through the filelist, looking for copies of the counter virus in these files. For each copy detected, a ParasiticFound counter is incremented. It will be seen that the process of opening and examining many files can be quite time consuming as in the case of conventional virus checkers, and because this processing would generally not be unnoticed by a user, it is preferable that the counter virus would be adapted to display a message box to the user indicating that virus detection is taking place, and possibly indicating the counter virus' progress through the filelist.

If, after iterating through the filelist, the ParasiticFound counter is greater than a Threshold, equal to the desired Population plus a small amount, then the user is alerted to the possible presence of a virus. A threshold is introduced because files only containing the counter virus may be innocently copied by a user between executions of the counter virus and in this case, the counter virus is concerned primarily with detecting explosive replication of a virus. Innocent copying is more likely with general purpose application documents than executable files, as the likelihood of a user copying say a 1998 version of a file to form a template for a 1999 version of a file is greater than a user duplicating executable files.

It will be seen, however, that as in the case of Nuclear.B, some viruses only incrementally infect a population and so introducing a threshold may expose a computer system to such infection. In this case, the counter virus may need to be adapted to respond to an application copy command (or an operating system copy command if the virus is detecting infection of executable file) where a user innocently copies a file, to cause the source file to be purged of the counter virus before being copied.

In the present example, the counter virus contains a routine for maintaining its population level. This loop operates: when the counter virus is first introduced into the file system, if files including the counter virus have been deleted, or if in the case of innocent duplication of the counter virus above, a document has been purged of the counter virus. In any case, this routine operates by looping through the filelist, finding files uninfected with the counter virus, finding a location in which to place the counter virus and infecting the file until the required population level is reached.

Infection of an uninfected target file operates in two ways. If there are no macros, then the target file is completely uninfected and the counter virus is copied either into a macro responding to one or more application events, for example, AutoOpen, or it is copied completely to the target file and calls to the counter virus macro are placed in macros responding to application events. If there are macros, then the target file may or may not be maliciously infected. Nonetheless, the counter virus simply, inserts its executable portion, lines 2–30 in the example of Table #2, into the text of one of the macros as shown in Table #3 without needing any knowledge of what that macro does.

In the example of table #2, the counter virus continues by moving its presence around the computer file system. In response to a randomly generated number exceeding a threshold, in this case 0.5, the counter virus deletes itself immediately after infecting another macro. It will be seen that the lower the threshold, the faster the counter virus will move through the file system.

A more advanced approach than maintaining a constant population level involves maintaining the counter virus as a proportion of the file system population; for example 10% of the files on the system are infected by the counter virus. This is achievable simply by introducing functionality to:

determine the proportion of files infected by the counter virus;

delete instances of the counter virus if the proportion is too high; and replicate if the proportion is falling too low.

It is still advisable to record the desired proportion of the population as an absolute number, as the test for viral replication could still be made against an absolute number. This would overcome the problem of alerting the user if a number of files uninfected with the counter virus were deleted between executions of the counter virus and its population within the file system grew proportionally.

Controlling the relative proportion of files infected with the counter virus is particularly useful to ensure that the counter virus executes at a reasonable frequency and this can be varied automatically if the counter virus keeps track of when it last executed. Thus if, for example, the counter virus macro responds to a file opening and it already infects 10% of the files in the system, then if it finds itself executing too frequently, it can reduce, possibly with user approval, the proportion to 8% by purging some infected files of the counter virus and vice versa by infecting more files with the counter virus.

It will been seen that the invention is not only applicable to detecting macro viruses and analogous implementation of a counter virus can made to detect infection of any type of file. Nonetheless, it is appreciated that implementation of the invention for executable files, for example, to detect a conventional DOS Assembly Language virus is difficult. This is because such executable code viruses, who know their own size, often replicate by copying a specific number of bytes into an uninfected file, rather than copying themselves logically as in the macro copying environment.

In this case, a counter virus needs to amend the actual virus in some way to ensure that the counter virus is successfully copied along with the virus. One possible method of achieving this is to use a compression algorithm to compress both the virus and the counter virus. This can only work, however, if the size of the original virus is sufficient to correspond to a compressed version of the virus, a compressed version of the counter virus and a decompression engine which reads the compressed code segments and calls the appropriate commands.

TABLE #1

A simple implementation of a computer virus:

```
01      Virus Start
02      FileList = list all visible files which support
this macro language
03      For count = 1 to Length (FileList)
04          If FileList(count) does not contain macro
named "virus " Then
05              MacroCopy virus to FileList(count)
06          End If
07      Next count
08      End Virus
```

TABLE #2

A simple implementation of a parasitic counter virus:

```
01      Parasitic Start
02      Signature = ZXYZ
03      FileList = list all visible files which support
this macro language
04      ParasiticFound = 0
05      For count = 1 to Length(FileList)
06          IF Search(Filelist(Count), Parasitic
Signature = "ZXYZ" Then
07              Inc (ParasiticFound)
08          End If
```

TABLE #2-continued

A simple implementation of a parasitic counter virus:

| | |
|---|---|
| 09 | Next count |
| 10 | If ParasiticFound > Threshold Then |
| 11 | Alert user to existence of a virus |
| 12 | End If |
| 13 | count = 0 |
| 14 | While ParasiticFound < Population AND Count < Length (Filelist) |
| 15 | IF NOT Search(Filelist(Count), Parasitic Signature = "ZXYZ") Then |
| 16 | Find location for script |
| 17 | Insert Parasitic virus code |
| 18 | Inc (ParasiticFound) |
| 19 | End If |
| 20 | Inc (count) |
| 21 | End While |
| 22 | If RandomNumber < 0.5 Then |
| 23 | While count < Length(Filelist) |
| 24 | IF NOT Search(Filelist(Count),Parasitic Signature = "ZXYZ") Then |
| 25 | Find location for script |
| 26 | Insert Parasitic virus code |
| 27 | Delete this instance of Parasitic |
| 28 | End If |
| 29 | Inc(count) |
| 30 | End While |
| 31 | End Parasitic |

TABLE #3

Virus infected with counter virus

| | |
|---|---|
| 01 | Virus Start |
| 02 | FileList = list all visible files which support this macro language |
| 03 | For count = 1 to Length (FileList) |
| 04 | If FileList(count) does not contain macro named "virus" Then |
| 05 | MacroCopy virus to FileList(count) |
| 06 | End If |
| 07 | Next count |
| 08 | Signature = ZXYZ |
| 09 | FileList = list all visible files which support this macro language |
| 10 | ParasiticFound = 0 |
| 11 | For count = 1 to Length(FileList) |
| 12 | IF Search(Filelist(Count), Parasitic Signature = "ZXYZ") Then |
| 13 | Inc (ParasiticFound) |
| 14 | End If |
| 15 | Next count |
| 16 | If ParasiticFound > Threshold Then |
| 17 | Alert user to existence of a virus |
| 18 | End If |
| 19 | count = 0 |
| 20 | While ParasiticFound < Population AND Count < Length (Filelist) |
| 21 | IF NOT Search(Filelist(Count), Parasitic Signature = "ZXYZ") Then |
| 22 | Find location for script |
| 23 | Insert Parasitic virus code |
| 24 | Inc (ParasiticFound) |
| 25 | End If |
| 26 | Inc (count) |
| 27 | End While |
| 28 | If RandomNumber < 0.5 Then |
| 29 | While count < Length(Filelist) |
| 30 | IF NOT Search(Filelist(Count), Parasitic Signature = "ZXYZ") Then |
| 31 | Find location for script |
| 32 | Insert Parasitic virus code |
| 33 | Delete this instance of Parasitic |
| 34 | End If |

TABLE #3-continued

Virus infected with counter virus

| | |
|---|---|
| 35 | Inc(count) |
| 36 | End While |
| 37 | End Parasitic |

What is claimed is:

1. A counter virus agent for detecting viral infection of a computer system comprising:

means for identifying potential host files for said agent within said computer system;

means for controlling replication of said agent within said host files to maintain said agent at a pre-determined population level;

means, instantiable within one of said host files, for determining the population level of said agent within said computer system; and means, responsive to said population level exceeding said pre-determined population level, for indicating possible viral infection of said computer system, wherein said replication controlling means comprises means for changing said pre-determined population level to cause said agent to be instantiated at a pre-determined frequency.

2. A counter virus agent as claimed in claim 1 wherein said agent comprises one or more macros for a general purpose application including a word processor, a spreadsheet, a database management system, a publishing package or a presentation package.

3. A counter virus as claimed in claim 2 wherein one of said macros comprises a macro, responsive to a user command to copy a host file, to cause said host file to be purged of said counter virus agent.

4. A counter virus agent as claimed in claim 1 wherein said agent comprises executable code.

5. A counter virus agent as claimed in claim 1 wherein said population level is a pre-determined number of host files.

6. A counter virus agent as claimed in claim 1 wherein said population level is a pre-determined proportion of the number of potential host files in said computer system.

7. A counter virus agent for detecting viral infection of a computer system comprising:

means for identifying potential host files for said agent within said computer system;

means for controlling replication of said agent within said host files to maintain said agent at a pre-determined population level;

means, instantiable within one of said host files, for determining the population level of said agent within said computer system; and means, responsive to said population level exceeding said pre-determined population level, for indicating possible viral infection of said computer system, wherein said agent comprises one or more macros for a general purpose application including a word processor, a spreadsheet, a database management system, a publishing package or a presentation package, and wherein said replication controlling means comprises means for detecting the presence of macros within a potential host file, means, responsive to the presence of one or more macros, for copying said counter virus agent into at least one of said macros, and means, responsive to the absence of macros, for copying said complete counter virus agent macro to said host file.

8. A method for detecting viral infection of a computer system comprising:

identifying potential host files for a counter virus agent within said computer system;

controlling replication of said agent within said host files to maintain said agent at a pre-determined population level;

instantiating said counter virus agent within one of said host files to determine the population level of said agent within said computer system; and responsive to said population level exceeding said pre-determined population level, indicating possible viral infection of said computer system;

wherein said agent comprises one or more macros for a general purpose application including a word processor, a spreadsheet, a database management system, a publishing package or a presentation package, and where controlling replication comprises (i) detecting the presence of macros within a potential host file, responsive to the presence of one or more macros, (ii) copying said counter virus agent into at least one of said macros, (iii) responsive to the absence of macros, copying said complete counter virus agent macro to said host file.

9. A method for detecting viral infection of a computer system comprising:

identifying potential host files for a counter virus agent within said computer system;

controlling replication of said agent within said host files to maintain said agent at a pre-determined population level;

instantiating said counter virus agent within one of said host files to determine the population level of said agent within said computer system; and responsive to said population level exceeding said pre-determined population level, indicating possible viral infection of said computer system;

wherein controlling replication comprises changing said pre-determined population level to cause said counter virus agent to be instantiated at a pre-determined frequency.

10. A computer program product comprising computer program code stored on a computer readable storage medium for, when executed on a computer system, detecting viral infection of said computer system, the program code comprising means for performing the method as claimed in claim 9.

* * * * *